United States Patent
Kim

(10) Patent No.: US 11,217,249 B2
(45) Date of Patent: Jan. 4, 2022

(54) INFORMATION PROCESSING METHOD AND APPARATUS THEREFOR

(71) Applicant: LG ELECTRONICS INC., Seoul (KR)

(72) Inventor: Sookyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 148 days.

(21) Appl. No.: 16/821,910

(22) Filed: Mar. 17, 2020

(65) Prior Publication Data

US 2021/0193139 A1 Jun. 24, 2021

(30) Foreign Application Priority Data

Dec. 18, 2019 (KR) .................. 10-2019-0169869

(51) Int. Cl.

| | | |
|---|---|---|
| *G10L 15/00* | (2013.01) | |
| *G10L 15/22* | (2006.01) | |
| *G10L 15/19* | (2013.01) | |
| *G10L 15/30* | (2013.01) | |
| *G10L 15/02* | (2006.01) | |
| *G10L 15/24* | (2013.01) | |
| *G06K 9/62* | (2006.01) | |
| *G06K 9/00* | (2006.01) | |
| *G10L 15/26* | (2006.01) | |
| *G10L 15/08* | (2006.01) | |

(52) U.S. Cl.
CPC .......... *G10L 15/22* (2013.01); *G06K 9/00624* (2013.01); *G06K 9/6217* (2013.01); *G10L 15/02* (2013.01); *G10L 15/19* (2013.01); *G10L 15/24* (2013.01); *G10L 15/30* (2013.01); *G10L 15/08* (2013.01); *G10L 15/26* (2013.01); *G10L 2015/025* (2013.01); *G10L 2015/223* (2013.01)

(58) Field of Classification Search
CPC ...... G06F 40/30; G06F 40/284; G06F 40/211; G06F 40/253; G06F 16/685; G10L 15/07; G10L 15/22; G10L 15/30; G10L 15/26; G10L 15/20; G10L 15/02; G10L 15/063; G10L 15/16; G10L 25/30; G10L 21/0208; G10L 25/78; G10L 25/87; G10L 15/08; G10L 15/1822; G10L 15/183; G10L 15/19; G10L 15/193
See application file for complete search history.

*Primary Examiner* — Vu B Hang
(74) *Attorney, Agent, or Firm* — Lee Hong Degerman Kang & Waimey

(57) ABSTRACT

Disclosed are an information processing method and apparatus therefor capable of controlling electronic device in a 5G communication environment by processing information through execution of a stored artificial intelligence (AI) algorithm or machine learning algorithm. An information processing method according to the present disclosure may include generating a sentence to control a controlled object by analyzing and supplementing input information obtained through various channels; and controlling the controlled object with a control command included in the sentence. According to the information processing apparatus according to the present disclosure, since the sentence to control the controlled object may be generated without leaking the utterance and image information obtained through the various input channels to a market-dominant natural language processing service enterprise, it is possible to protect a user's privacy.

20 Claims, 10 Drawing Sheets

INFORMATION PROCESSING METHOD AND APPARATUS THEREFOR

CROSS-REFERENCE TO RELATED APPLICATION

Pursuant to 35 U.S.C. § 119(a), this application claims the benefit of earlier filing date and right of priority to Korean Patent Application No. 10-2019-0169869, filed on Dec. 18, 2019, the contents of which are all hereby incorporated by reference herein in their entirety.

BACKGROUND

1. Technical Field

The present disclosure relates to an information processing method and apparatus therefor for generating and processing a sentence to control a controlled object by using a plurality of pieces of information inputted through various channels, based on executing an artificial intelligence (AI) algorithm or machine learning algorithm in a 5G communication environment.

2. Description of Related Art

In recent years, electronic devices offer various input methods as part of pursuing interaction with a user. For example, the electronic devices may perform a speech input method for receiving speech data spoken by a user, based on executing a specific application program. Furthermore, the electronic devices may recognize the received speech data to derive an intention of a user utterance, and may support a speech recognition service for performing a function corresponding to the intention.

The above-described background technology is technical information that the inventors have held for the derivation of the present disclosure or that the inventors acquired in the process of deriving the present disclosure. Thus, the above-described background technology cannot be regarded as known technology disclosed to the general public prior to the filing of the present application.

SUMMARY OF THE INVENTION

The present disclosure is directed to generating and processing a sentence to control a controlled object by using a plurality of pieces of input information obtained through various input channels.

The present disclosure is further directed to, when there is a missing sentence component in a sentence generated using utterance information obtained through one input channel of various input channels, generating and processing a sentence supplemented with the missing sentence component by using image information obtained through another input channel of the various input channels.

The present disclosure is still further directed to providing a personalized service for a specific controlling subject (a talker) with respect to a controlled object, by identifying the controlling subject and a controlled object controlled by the controlling subject, based on a plurality of pieces of input information obtained through various input channels, and by generating a sentence based on a control command preferred by the controlling subject in relation to the controlled object and identification information on the controlling subject.

The present disclosure is still further directed to generating and processing a sentence accurately reflecting a user's intention to control a controlled object, by using utterance information and image information obtained through various input channels.

The present disclosure is still further directed to generating and processing a sentence to control a controlled object, without leaking a plurality of pieces of input information obtained through various input channels to a market-dominant natural language processing service enterprise.

The present disclosure is still further directed to increasing speed but decreasing costs in controlling a controlled object, by generating a sentence to control the controlled object based on a plurality of pieces of input information obtained through various input channels.

An information processing method according to one embodiment of the present disclosure may include generating a sentence to control a controlled object by analyzing and supplementing input information obtained through various channels; and controlling the controlled object with a control command included in the sentence.

Specifically, the information processing method according to the present embodiment may include: obtaining image information including a controlled object and a controlling subject, and assigning identification information to the controlled object and the controlling subject, respectively, based on analysis of the image information; obtaining utterance information spoken by the controlling subject, which is a talker, and generating an utterance text by converting the utterance information into text; generating a first sentence based on analysis of the utterance text; extracting a missing sentence component from the first sentence based on sentence structure analysis; generating supplementary information by using one or more of the identification information on the controlling subject and a group of control commands in text form indicating possible functions of the controlled object in its current state as known from the identification information on the controlled object, in response to the extraction of the missing sentence component; generating a second sentence supplemented with the missing sentence component by using the supplementary information; and calling the controlled object by using the identification information on the controlled object included in the second sentence, and distributing a first control command included in the second sentence of the group of control commands to the called controlled object.

According to the information processing method according to the present embodiment, since a user's intention may be accurately reflected in the sentence generated using the utterance and image information obtained through the various input channels, it is possible to improve convenience of the controlling subject in using the controlled object.

An information processing apparatus according to another embodiment of the present disclosure may include: an image analyzer configured to obtain image information including a controlled object and a controlling subject, and to assign identification information to the controlled object and the controlling subject, respectively, based on analysis of the image information; a text converter configured to obtain utterance information spoken by the controlling subject, which is a talker, and to generate an utterance text by converting the utterance information into text; a first sentence generator configured to generate a first sentence based on analysis of the utterance text; an extractor configured to extract a missing sentence component from the first sentence based on sentence structure analysis; a supplementary information generator configured to generate supplementary information by using one or more of the identification information on the controlling subject and a group of control commands in text form indicating possible functions of the controlled object in its current state as known from the identification information on the controlled object, in response to the extraction of the missing sentence component; a second sentence generator configured to generate a second sentence supplemented with the missing sentence component by using the supplementary information; and a distributor configured to call the controlled object by using the identification information on the controlled object included in the second sentence, and to distribute a first control command included in the second sentence of the group of control commands to the called controlled object.

According to the information processing apparatus according to the present embodiment, since the sentence generated to control the controlled object may be used as is in a market-dominant cloud-based natural language processing service, it is possible to provide a multimodal human computer interaction (HCI) environment to control the controlled object, and adapt it to an industrial ecosystem by linking it with post-services such as knowledge retrieval.

In addition, according to the information processing apparatus according to the present embodiment, since the controlling subject (the talker) and the controlled object controlled by the controlling subject may be identified based on the utterance and image information obtained through the various input channels, and the sentence may be generated based on the control command preferred by the controlling subject in relation to the controlled object and the identification information on the controlling subject, it is possible to provide a personalized service for a specific controlling subject with respect to the controlled object.

In addition, according to the information processing apparatus according to the present embodiment, since the sentence to control the controlled object may be generated without leaking the utterance and image information obtained through the various input channels to a market-dominant natural language processing service enterprise, it is possible to protect a user's privacy.

In addition, according to the information processing apparatus according to the present embodiment, since the sentence to control the controlled object may be generated based on the utterance and image information obtained through the various input channels, it is possible to increase speed but decrease costs in controlling the controlled object.

In addition to the aforementioned, other methods and systems for implementing the present disclosure, and a computer-readable recording medium having a computer program stored thereon for executing the methods, may be further provided.

Other aspects, features, and advantages will become apparent from the following drawings, claims, and detailed description of the invention.

According to the present disclosure, since the sentence generated to control the controlled object may be used as is in a market-dominant cloud-based natural language processing service, it is possible to provide a multimodal human computer interaction (HCI) environment to control the controlled object, and adapt it to an industrial ecosystem by linking it with post-services such as knowledge retrieval.

In addition, according to the present disclosure, since the controlling subject (the talker) and the controlled object controlled by the controlling subject may be identified based on the utterance and image information obtained through the various input channels, and the sentence may be generated based on the control command preferred by the controlling subject in relation to the controlled object and the identification information on the controlling subject, it is possible to provide a personalized service for a specific controlling subject with respect to the controlled object.

In addition, according to the present disclosure, since the user's intention may be accurately reflected in the sentence generated using the utterance and image information obtained through the various input channels, it is possible to improve convenience of the controlling subject in using the controlled object.

In addition, according to the present disclosure, since the sentence to control the controlled object may be generated without leaking the utterance and image information obtained through the various input channels to a market-dominant natural language processing service enterprise, it is possible to protect the controlling subject's privacy.

In addition, according to the present disclosure, since the sentence to control the controlled object may be generated based on the utterance and image information obtained through the various input channels, it is possible to increase speed but decrease costs in controlling the controlled object.

The effects of the present disclosure are not limited to those mentioned above, and other effects not mentioned can be clearly understood by those skilled in the art from the following description.

DETAILED DESCRIPTION

Figure 1:
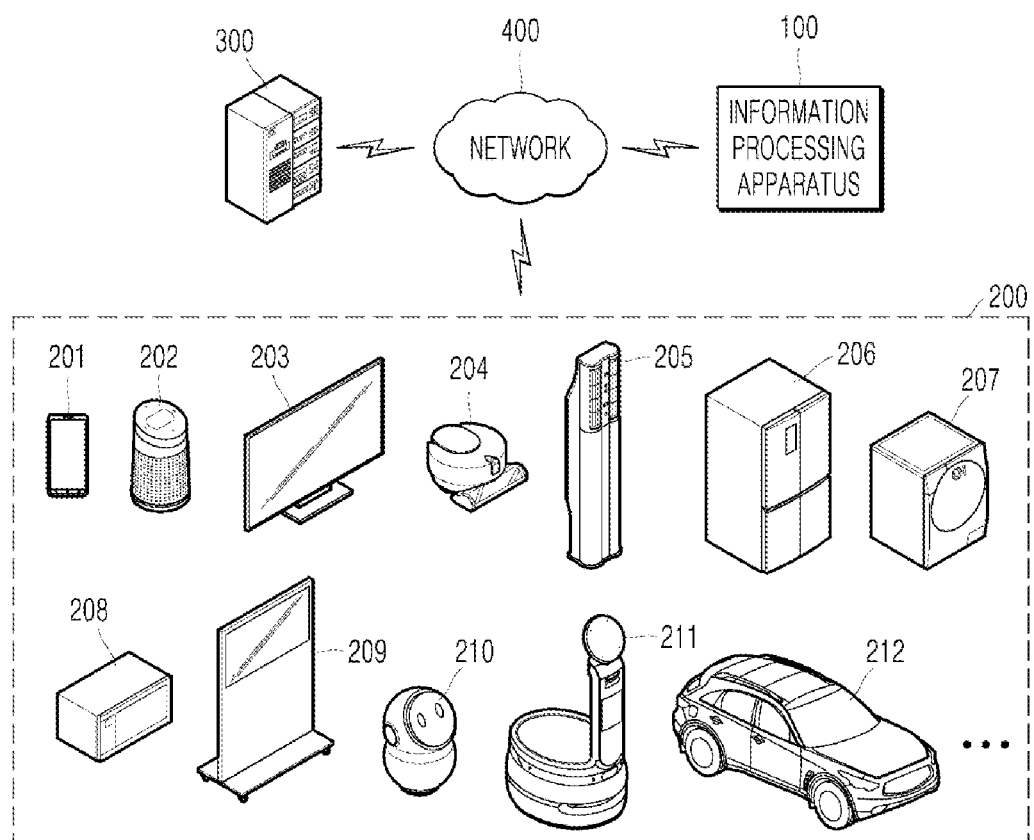
FIG. 1 is a diagram illustrating an information processing environment including an information processing apparatus, electronic devices, a server, and a network for connecting the foregoing components, according to one embodiment of the present disclosure.

The advantages and features of the present disclosure and methods to achieve them will be apparent from the embodiments described below in detail in conjunction with the accompanying drawings. However, the description of particular exemplary embodiments is not intended to limit the present disclosure to the particular exemplary embodiments disclosed herein, but on the contrary, it should be understood that the present disclosure is to cover all modifications, equivalents and alternatives falling within the spirit and scope of the present disclosure. The embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. It must be noted that as used herein and in the appended claims, the singular forms "a," "an," and "the" include the plural references unless the context clearly dictates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Although the terms first, second, and the like, may be used herein to describe various elements, these elements should not be limited by these terms. These terms are generally only used to distinguish one element from another.

Hereinafter, embodiments of the present disclosure will be described in detail with reference to the accompanying drawings, and in the description with reference to the accompanying drawings, the same or corresponding components have the same reference numeral, and a duplicate description therefor will be omitted.

Figure 2:
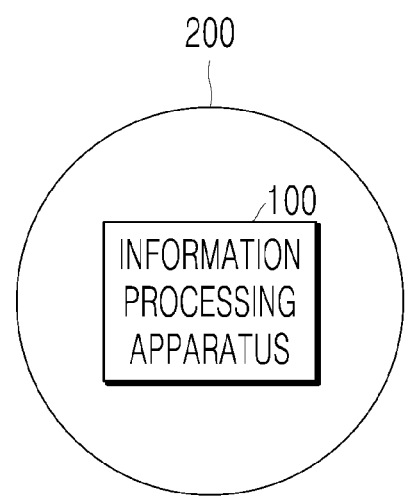
FIG. 2 is a diagram illustrating an implementation of an information processing apparatus, according to one embodiment of the present disclosure.

FIG. 1 is a diagram illustrating an information processing environment including an information processing apparatus, electronic devices, a server, and a network for connecting the foregoing components, according to one embodiment of the present disclosure, and FIG. 2 is a diagram illustrating an implementation of the information processing apparatus, according to the present embodiment. Referring to FIGS. 1 and 2, the information processing environment may include an information processing apparatus 100, electronic devices 200, a server 300, and a network 400.

The information processing apparatus 100 may generate a sentence to control a controlled object by analyzing and supplementing input information obtained through various channels, and control the controlled object with a control command included in the sentence.

To this end, the information processing apparatus 100 may obtain image information including the controlled object and a controlling subject, and assign identification information (for example, ID) to the controlled object and the controlling subject, respectively, based on analysis of the image information. Here, the controlled object may include one of the electronic devices 200 described below, and the controlling subject may include a talker controlling the controlled object. In addition, the image information may be obtained through a camera 120 of FIG. 3 described below. The information processing apparatus 100 may identify the controlled object and the controlling subject based on feature points extracted from the image information, and assign predetermined identification information to the identified controlled object and controlling subject, respectively.

The information processing apparatus 100 may obtain utterance information spoken by the controlling subject, and generate an utterance text by converting the utterance information into text. Here, the utterance information may be obtained through an audio input interface 151 of FIG. 3 described below. The information processing apparatus 100 may convert the utterance information into the utterance text by using a speech to text (STT) algorithm.

The information processing apparatus 100 may generate a first sentence based on analysis of the utterance text. The information processing apparatus 100 may generate the first sentence by using some of natural language processing techniques (for example, morpheme analysis, part-of-speech tagging, and syntax analysis).

The information processing apparatus 100 may extract a missing sentence component from the first sentence based on sentence structure analysis. The information processing apparatus 100 may analyze the sentence structure of the first sentence, compare the first sentence with a complete sentence composed of a subject, an object and a predicate, and extract the missing sentence component (for example, the subject or the predicate) from the first sentence.

The information processing apparatus 100 may generate supplementary information by using one or more of the identification information on the controlling subject and a group of control commands in text form indicating possible functions of the controlled object in its current state as known from the identification information on the controlled object, in response to the extraction of the missing sentence component. For example, when the missing sentence component is the predicate, the information processing apparatus 100 may generate supplementary information to supplement the predicate by using one control command (for example, a first control command) of the group of control commands. In addition, when the missing sentence component is the subject, the information processing device 100 may generate the supplementary information to supplement the subject by using the identification information on the controlling subject.

In the present embodiment, it may be specified in the utterance and image information what sentence component the corresponding information may be used as, to generate the complete sentence (for example, a second sentence). For example, all parts-of-speech, and nouns corresponding to the subject and the object, are specified in the utterance information, so that the information processing apparatus 100 may extract all sentence components from the utterance information. In addition, an adverb corresponding to an adverbial clause or a conditional clause, nouns corresponding to the subject and the object, and a verb corresponding to a command are specified in the image information, so that the information processing apparatus 100 may extract the sentence components corresponding to the noun, the verb, and the adverb from the image information. In addition, the adverb corresponding to the adverbial or conditional clause is specified in activity information described below, so that the information processing apparatus 100 may extract the sentence component corresponding to the adverb from the activity information.

The information processing apparatus 100 may generate the second sentence supplemented with the missing sentence component by using the generated supplementary information. Here, the second sentence may include a complete sentence composed of a subject, an object, and a predicate.

The information processing apparatus 100 may call the controlled object by using the identification information on the controlled object included in the second sentence, and distribute the first control command included in the second sentence of the group of control commands to the called controlled object.

Prior to distributing the first control command, the information processing apparatus 100 may retrieve whether the same control command as the first control command included in the second sentence is present among previously stored control commands, based on a result of comparing the first control command with the previously stored control commands. The information processing apparatus 100 may transmit the second sentence together with a natural language processing request signal to a server 300 (an external natural language processor), based on the absence of the same control command among the previously stored control commands as the first control command as a result of retrieving, and receive, from the server 300, a natural language processing result of the second sentence including the identification information on the controlled object and the control command. The information processing apparatus 100 may call the controlled object based on the natural language processing result of the second sentence received from the server 300, and distribute the control command to the called controlled object.

In general, since the obtained input information (the utterance and image information) should be transmitted to the server 300 to receive the natural language processing result from the server 300, the controlling subject's privacy may be leaked to the outside. However, according to the present embodiment, since the information processing apparatus 100 only needs to transmit the second sentence to the server 300, the controlling subject's privacy may be protected.

After generating the second sentence, the information processing apparatus 100 may retrieve whether historical activity information regarding the controlling subject having controlled the controlled object is present, by using the identification information on the controlling subject and the identification information on the controlled object. The information processing apparatus 100 may generate, based on the presence of the historical activity information as a result of retrieving, from the historical activity information, a third sentence in text form indicating a second control command preferred by the controlling subject in relation to the controlled object and the identification information on the controlling subject.

Here, the activity information may be stored in a memory (170 of FIG. 3), and include history information regarding the controlling subject having controlled the controlled object in the past, that is, one or more previously distributed second sentences. Here, the one or more previously distributed second sentences may include the identification information on the controlled object called in the past and the first control command distributed to the determined controlled object. In addition, the one or more previously distributed second sentences may include the time of distributing the first control command, the number of times of repeatedly distributing the first control command, and information on which controlling subject (for example, which family member) generated the first control command. In addition, the activity information may be stored in the memory (170 of FIG. 3), and include, for example, behavior information, interest information, preference information, retrieval information, usage information, operation information, and collection information on the controlling subject, which are generated using one or more of the controlled object and a terminal of the controlling subject.

The information processing apparatus 100 may call the controlled object by using the identification information on the controlled object included in the second and third sentences, and distribute the first control command included in the second sentence and the second control command included in the third sentence to the called controlled object. According to the information processing apparatus 100 according to the present embodiment, it is possible to provide a personalized service for a specific controlling subject with respect to the controlled object, by generating the third sentence based on the control command preferred by the controlling subject in relation to the controlled object and the identification information on the controlling subject.

Examples of the electronic device 200 (the controlled object) may include the following: a home appliance, such as a user terminal 201, an artificial intelligence speaker 202 that serves as a hub to connect other electronic devices to the network 400, a television (TV) 203, a robot cleaner 204, an air conditioner 205, a refrigerator 206, a washing machine 207, and a microwave oven 208; displays such as a signage 209, provided in public places or commercial spaces; a first communication robot 210 provided in a home and emotionally communicating with a user through, for example, gaze, emotion expression, and physical contact; a second communication robot 211 for performing, for example, patrol, guidance, cleaning, quarantine, and transportation in public places (for example, airports, hospitals, and companies); and various devices corresponding to the Internet of Things (IoT), such as an automobile 212. However, the examples of the electronic device 200 are not limited to those illustrated in FIG. 1. In the present embodiment, the information processing apparatus 100 may be provided separately as shown in FIG. 1. Alternatively, the information processing apparatus 100 may be provided inside the electronic device 200 as shown in FIG. 2, allowing the electronic device 200 to serve as the information processing apparatus 100.

The user terminal 201 of the electronic device 200 may access an application or site for driving the information processing apparatus, and after passing an authentication process may be provided with a service for driving or controlling the information processing apparatus 100. In the present embodiment, the user terminal 201 that has passed the authentication process may drive the information processing apparatus 100, and control the operation of the information processing apparatus 100.

In the present embodiment, the user terminal 201 may be a desktop computer, a smartphone, a notebook, a tablet PC, a smart TV, a mobile phone, a personal digital assistant (PDA), a laptop, a media player, a micro server, a global positioning system (GPS) device, an electronic book terminal, a digital broadcasting terminal, a navigation, a kiosk, a MP4 player, a digital camera, a home appliance, and other mobile or non-mobile computing devices, which are operated by a user, but is not limited thereto. In addition, the user terminal 201 may be a wearable terminal, such as a watch, glasses, a hair band, and a ring, which has a communication function and a data processing function. Examples of the user terminal 201 are not limited thereto. Any terminal capable of performing web browsing may be used without limitation.

The server 300 may be a database server that provides, to the information processing apparatus 100, big data used to apply various artificial intelligence algorithms, as well as data processed according to a request from the information processing apparatus 100. Furthermore, the server 300 may include a web server or an application server that enables remote control of the operation of the information processing apparatus 100 by using an information processing apparatus-driving application or an information processing apparatus-driving web browser, which is provided in the user terminal 201.

In response to the information processing apparatus 100 requesting a natural language processing of the second or third sentence, the server 300 may receive the second or third sentence from the information processing apparatus 100, and then interpret and process the controlled object and the control command from the second or third sentence and transmit the result to the information processing apparatus 100. The server 300 may perform one or more of natural language understanding processing, dialog manager processing, natural language generation processing, and text-speech conversion processing, to interpret and process the second or third sentence. In addition, the server 300 may execute an artificial intelligence (AI) algorithm or a machine learning algorithm in a 5G communication environment to interpret and process the second or third sentence.

Artificial intelligence (AI) is an area of computer engineering science and information technology that studies methods to make computers mimic intelligent human behaviors such as reasoning, learning, self-improving, and the like.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed. More specifically, machine learning is a technology that investigates and builds systems, and algorithms for such systems, which are capable of learning, making predictions, and enhancing their own performance on the basis of experiential data. Machine learning algorithms, rather than only executing rigidly-set static program commands, may be used to take an approach that builds models for deriving predictions and decisions from inputted data.

The network 400 may serve to connect the information processing apparatus 100, the electronic device 200, and the server 300 to each other. The network 400 may include, but is not limited to, wired networks, such as local area networks (LANs), wide area networks (WANs), metropolitan area networks (MANs), and integrated service digital networks (ISDNs); or wireless networks, such as wireless LANs, CDMA, Bluetooth®, and satellite communications. In addition, the network 400 may transmit and receive information by using a short-distance communication or a long-distance communication. Here, the short-distance communication may include Bluetooth®, radio frequency identification (RFID), infrared data association (IrDA), ultra-wideband (UWB), ZigBee, and wireless fidelity (Wi-Fi) technologies, and the long-distance communication may include code division multiple access (CDMA), frequency division multiple access (FDMA), time division multiple access (TDMA), orthogonal frequency division multiple access (OFDMA), and single carrier frequency division multiple access (SC-FDMA) technologies.

The network 400 may include a connection between network components, such as a hub, a bridge, a router, a switch, and a gateway. The network 400 may include one or more connected networks, for example, a multi-network environment, including a public network such as the Internet and a private network such as a secure enterprise private network. Access to the network 400 may be provided through one or more wired or wireless access networks. Furthermore, the network 400 may support 5G communications or Internet of Things (IoT) networks for exchanging and processing information between distributed components such as objects.

Figure 3:
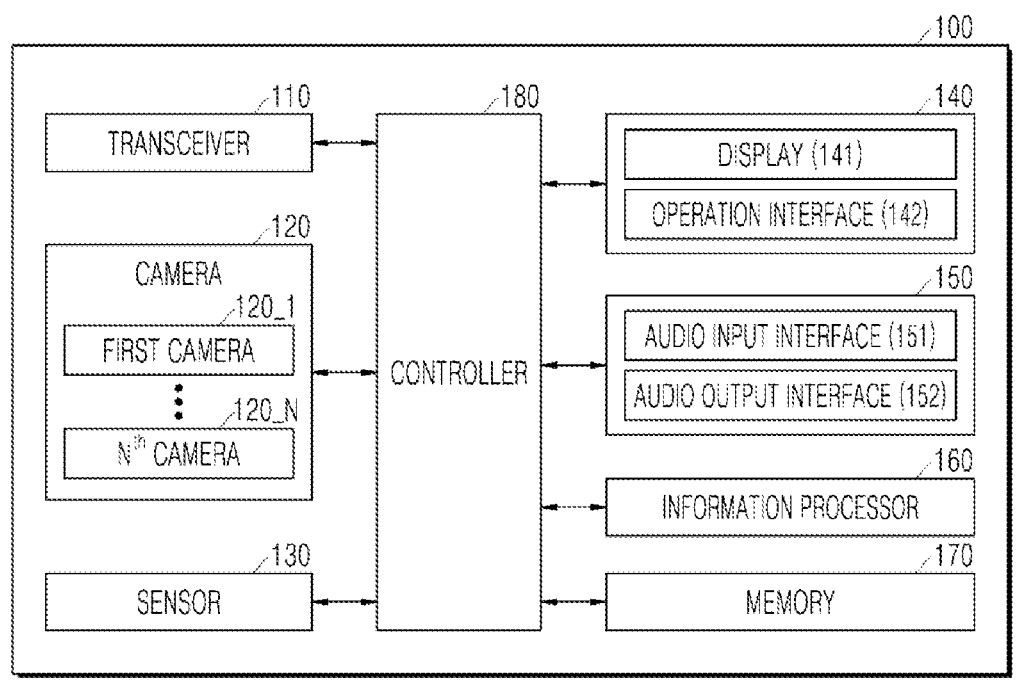
FIG. 3 is a diagram schematically illustrating a detailed configuration of an information processing apparatus, according to one embodiment of the present disclosure.

FIG. 3 is a diagram schematically illustrating a detailed configuration of the information processing apparatus, according to one embodiment of the present disclosure. In the following description, description overlapping with those of FIGS. 1 and 2 will be omitted. Referring to FIG. 3, the information processing apparatus 100 may include a transceiver 110, a camera 120, a sensor 130, a user interface 140, an audio processor 150, an information processor 160, a memory 170, and a controller 180.

The transceiver 110 may interwork with the network 400 to provide a communication interface used to transmit and receive signals in the form of packet data between the information processing apparatus 100, the electronic device 200, and the server 300. Furthermore, the transceiver 110 may serve to receive predetermined information request signal from the electronic device 200, and may serve to transmit information processed by the information processing apparatus 100 to the electronic device 200. In addition, the transceiver 110 may transmit the predetermined information request signal from the electronic device 200 to the server 300, receive a response signal processed by the server 300, and then transmit the response signal to the electronic device 200. In addition, the transceiver 110 may be a device including a hardware and a software which are used to transmit and receive signals, such as control or data signals, to and from another network device via a wired or wireless connection.

In addition, the transceiver 110 may support a variety of object intelligent communications (for example, Internet of Things (IoT), Internet of Everything (IoE), and Internet of Small Things (IoST)), and may support, for example, machine to machine (M2M) communication, vehicle to everything (V2X) communication, and device to device (D2D) communication.

The camera 120 may include a first camera 120_1 to an $N^{th}$ camera 120_N. The camera 120 may capture an image of the controlling subject near the electronic device 200 under the control of the controller 180. For example, the camera 120 may capture, for example, an image of the controlling subject operating the electronic device 200, an image of the controlling subject speaking or pointing toward the electronic device 200, and an image of the controlling subject moving after finishing the operation of the electronic device 200. The camera 120 may refer to a camera for capturing a photographed thing in a photographed area by using, for example, a complementary metal-oxide semiconductor (COMS) module (not shown) or a charge coupled device (CCD) module (not shown). An inputted image frame may be provided to the COMS module or the CCD module through a lens (not shown), and the COMS module or the CCD module may convert an optical signal of the photographed thing that passed through the lens, into an electrical signal, and output the electrical signal. In addition, the camera 120 may be a PTZ camera having a pan/tilt/zoom function. The camera 120 may capture a still image, as well as a video composed of a number of still image frames. Meanwhile, the image captured and obtained by the camera 120 may be stored in the memory 170.

In the present embodiment, the information processing apparatus 100 may further include an image processor (not shown) to analyze and process the image captured by the camera 120. The image processor may be provided inside or outside the camera 120. The image processor may reduce a noise in an image frame acquired by the camera 120, and perform image signal processing operations, such as gamma correction, color filter array interpolation, color matrix, color correction, and color enhancement, to improve an image quality. In addition, the image processor may perform functions, such as color processing, blur processing, edge enhancement processing, image interpretation processing, image recognition processing, and image effect processing. For example, the image processor may perform, as the image recognition, for example, facial recognition, scene recognition, and motion recognition. For example, the image processor may perform, for example, brightness level adjustment, color correction, contrast adjustment, contour enhancement adjustment, screen division processing, generation of, for example, an image of character, and synthesis of images.

The sensor 130 may include one or more sensors for detecting at least one of information on the controlling subject or information on an environment surrounding the information processing apparatus 100 or the electronic device 200. For example, the sensor 130 may include at least one of an obstacle detection sensor (for example, a proximity sensor and a Light Detection And Ranging (LiDAR) sensor), a weight detection sensor, an illumination sensor, a touch sensor, an acceleration sensor, a magnetic sensor, a gravity sensor (G-sensor), a gyroscope sensor, a motion sensor, an RGB sensor, an infrared (IR) sensor, a fingerprint recognition sensor, an ultrasonic sensor, an optical sensor (for example, the camera 121), a microphone (for example, the audio input interface 151), an environment sensor (for example, a barometer, a hygrometer, a thermometer, a radioactivity detection sensor, a heat detection sensor, and a gas detection sensor), and a chemical sensor (for example, an electronic nose, a healthcare sensor, and a biometric sensor). Meanwhile, in the present embodiment, the information processing apparatus 100 may combine various information detected by at least two of the above-mentioned sensors, and use the combined information.

A display 141 of the user interface 140 may display a driving state of the information processing apparatus 100 under the control of the controller 180. Depending on the embodiment, the display 141 may form an inter-layer structure with a touch pad to be configured as a touch screen. In this case, the display 141 may also be used as an operation interface 142 capable of inputting information according to touching by the controlling subject. To this end, the display 141 may be configured as a touch-sensitive display controller or various other input/output controllers. As an example, the touch-sensitive display controller may provide output and input interfaces between the apparatus and the controlling subject. The touch-sensitive display controller may transmit and receive electric signals to and from the controller 180. In addition, the touch-sensitive display controller may display a visual output to the controlling subject, and the visual output may include text, graphics, image, video, and a combination thereof. The display 141 may be a predetermined display member, such as a touch-sensitive organic light emitting display (OLED), a liquid crystal display (LCD), or a light emitting display (LED).

The operation interface 142 of the user interface 140 may include a plurality of operation buttons (not shown) to transmit an input signal corresponding to each operation button to the controller 180. The operation interface 142 may be configured as a switch structure, or a sensor or button capable of recognizing touching or pressing by the controlling subject. In the present embodiment, the operation interface 142 may transmit, to the controller 180, an operation signal operated by the controlling subject, to check or modify various information on driving of the information processing apparatus 100, which is displayed on the display 141.

An audio input interface 151 of the audio processor 150 may receive the utterance information from the controlling subject and transmit it to the controller 180, and the controller 180 may perform speech recognition by using the utterance information on the controlling subject. To this end, the audio input interface 151 may include one or more microphones (not shown). In addition, the audio input interface 151 may include a plurality of microphones (not shown) to more accurately receive the utterance information on the controlling subject. Here, each of the plurality of microphones may be spaced apart from each other at different positions, and process the received utterance information on the controlling subject as an electrical signal.

In an alternative embodiment, the audio input interface 151 may use various noise removal algorithms to remove noise generated in the process of receiving the utterance information on the controlling subject. In an alternative embodiment, the audio input interface 151 may include various components for signal processing the utterance information on the controlling subject, such as a filter (not shown) for removing the noise when receiving the utterance information on the controlling subject and an amplifier (not shown) for amplifying and outputting the signal outputted from the filter.

Under the control of the controller 180, an audio output interface 152 of the audio processor 150 may output, as audio, for example, a notification message, such as a warning sound, an operation mode, an operation state, and an error state, and processing results corresponding to a speech command included in feedback utterance information on the controlling subject. In the present embodiment, the audio output interface 152 may output the utterance information on the second or third sentence generated by the information processor 160, or may output a result of the electronic device 200 operating according to the second or third sentence. The audio output interface 152 may convert electric signals from the controller 180 into audio signals, and output the audio signals. To this end, the audio output interface 152 may include, for example, a speaker.

The information processor 160 may obtain image information including the controlled object and the controlling subject, and assign identification information to the controlled object and the controlling subject, respectively, based on analysis of the image information. The information processor 160 may obtain the utterance information spoken by the controlling subject (the talker), and generate an utterance text by converting the utterance information into text. The information processor 160 may generate the first sentence based on analysis of the utterance text. The information processor 160 may extract a missing sentence component from the first sentence based on sentence structure analysis. The information processing apparatus 100 may generate supplementary information by using one or more of the identification information on the controlling subject and a group of control commands in text form indicating possible functions of the controlled object in its current state as known from the identification information on the controlled object, in response to the extraction of the missing sentence component. The information processor 160 may generate the second sentence supplemented with the missing sentence component by using the supplementary information. The information processor 160 may call the controlled object by using the identification information on the controlled object included in the second sentence, and distribute the first control command included in the second sentence of the group of control commands to the called controlled object.

Prior to distributing the first control command, the information processor 160 may retrieve whether the same control command as the first control command included in the second sentence is present among previously stored control commands, based on a result of comparing the first control command with the previously stored control commands.

Based on the absence of the same control command as the first control command among the previously stored control commands, the information processor 160 may transmit the second sentence together with a natural language processing request signal to the server 300. The information processor 160 may receive, from the server 300, a natural language processing result of the second sentence.

After generating the supplementary information, the information processor 160 may retrieve whether historical activity information regarding the controlling subject having controlled the controlled object is present, by using the identification information on the controlling subject and the identification information on the controlled object. Based on the presence of the historical activity information, the information processor 160 may generate, from the historical activity information, a third sentence in text form indicating the second control command preferred by the controlling subject in relation to the controlled object and the identification information on the controlling subject. The information processor 160 may call the controlled object by using the identification information on the controlled object included in the second and third sentences, and distribute the first control command included in the second sentence and the second control command included in the third sentence to the called controlled object.

In the present embodiment, the information processor 160 may perform learning in connection with the controller 180, or may receive learning results from the controller 180. In the present embodiment, the information processor 160 may be provided outside the controller 180 as shown in FIG. 3, or may be provided inside the controller 180 to serve as the controller 180. Hereinafter, the information processor 160 will be described in greater detail with reference to FIG. 4.

The memory 170, which may store a variety of information used to operate the information processing apparatus 100 and control software capable of operating the information processing apparatus 100, may include a volatile or non-volatile recording medium. For example, the memory 170 may store a predetermined wake-up word to determine the presence of a wake-up word from the utterance information on the controlling subject.

In addition, the memory 170 may store the utterance information obtained through the audio input interface 151, the image information obtained through the camera 120, and the historical activity information. In addition, the memory 170 may store processing results of the information processor 160.

In addition, the memory 170 may store commands to be executed by the information processor 160, including the following: a command for obtaining the image information including the controlled object and the controlling subject, and assigning the identification information to the controlled object and the controlling subject, respectively, based on analysis of the image information; a command for obtaining the utterance information spoken by the controlling subject (the talker), and generating the utterance text by converting the utterance information into text; a command for generating the first sentence based on analysis of the utterance text; a command for extracting the missing sentence component from the first sentence based on sentence structure analysis; a command for generating the supplementary information by using one or more of the identification information on the controlling subject and a group of control commands in text form indicating possible functions of the controlled object in its current state as known from the identification information on the controlled object, in response to the extraction of the missing sentence component; a command for generating the second sentence supplemented with the missing sentence component by using the supplementary information; a command for calling the controlled object by using the identification information on the controlled object included in the second sentence, and distributing the first control command included in the second sentence of the group of control commands to the called controlled object; and the like.

Here, the memory 170 may include a magnetic storage medium or a flash storage medium, but the scope of the present disclosure is not limited thereto. The memory 170 may include an internal memory or an external memory, and may include a volatile memory, such as a DRAM, a SRAM or a SDRAM; a non-volatile memory, such as an one time programmable ROM (OTPROM), a PROM, an EPROM, an EEPROM, a mask ROM, a flash ROM, a NAND flash memory, or a NOR flash memory; a flash drive, such as an SSD, a compact flash (CF) card, an SD card, a Micro-SD card, a Mini-SD card, an Xd card or memory stick; or a storage device such as a HDD.

In the present embodiment, generating the first to third sentences used in simple speech recognition and controlling of the controlled object may be performed by the information processing apparatus 100, and interpreting or processing the second or third sentence may be performed by the server 300. For example, when the controlled object and the control command which are included in the second or third sentence are unable to be identified, the information processing apparatus 100 may request the server 300 to interpret or process the controlled object and the control command. The server 300 may receive the second or third sentence from the information processing apparatus 100, and may interpret and process the controlled object and the control command and then transmit the result to the information processing apparatus 100.

The controller 180 may transmit the utterance and image information to the information processor 160, and may provide a generation result of the second or third sentence received from the information processor 160, as visual information on the display 141 or as auditory information through the audio output interface 152. In addition, the controller 180 may provide an operation result of the controlled object according to the control command, as visual information on the display 141 or as auditory information through the audio output interface 152.

The controller 180, which may be a central processing unit, may control the entire operation of the information processing apparatus 100 by driving a control software stored in the memory 170. The controller 180 may include any type of device capable of processing data, such as a processor. Here, the "processor" may represent, for example, a hardware-embedded data processing device having a physically structured circuitry to perform functions represented by codes or commands included in a program. An example of the hardware-embedded data processing device may include a processing device, such as a microprocessor, a central processing unit (CPU), a processor core, a multi-processor, an application-specific integrated circuit (ASIC), and a field programmable gate array (FPGA). However, the scope of the present disclosure is not limited thereto.

In the present embodiment, the controller 180 may perform machine learning such as deep learning on one or more of the utterance information and the image information so as to enable the information processing apparatus 100 to output an optimal information processing result. The memory 170 may store, for example, data used in the machine learning, and result data.

Deep learning, which is a subfield of machine learning, enables data-based learning through multiple layers. As the number of layers in deep learning increases, the deep learning network may acquire a collection of machine learning algorithms that extract core data from multiple datasets.

Deep learning structures may include an artificial neural network (ANN), and may include a convolutional neural network (CNN), a recurrent neural network (RNN), a deep belief network (DBN), and the like. The deep learning structure according to the present embodiment may use various structures well known in the art. For example, the deep learning structure according to the present disclosure may include a CNN, an RNN, a DBN, and the like. RNN is widely used in natural language processing and may configure an artificial neural network structure by building up layers at each instant in a structure that is effective for processing time-series data which vary with time. A DBN may include a deep learning structure formed by stacking up multiple layers of restricted Boltzmann machines (RBM), which is a deep learning scheme. When a predetermined number of layers are constructed by repetition of RBM learning, the DBN having the predetermined number of layers may be constructed. A CNN may include a model mimicking a human brain function, which is built under the assumption that when a person recognizes an object, the brain extracts the most basic features of the object and recognizes the object based on the result of complex calculations in the brain.

Further, the artificial neural network may be trained by adjusting weights of connections between nodes (if necessary, adjusting bias values as well) so as to produce a desired output from a given input. Also, the artificial neural network can continuously update the weight values through learning. Furthermore, methods such as back propagation may be used in training the artificial neural network.

Meanwhile, the controller 180 may be provided with an artificial neural network, and may generate sentences based on machine learning by using, as input data, at least one of the received utterance information or the received image information.

The controller 180 may include the artificial neural network such as a deep neural network (DNN) including, for example, a CNN, an RNN, and a DBN, and may train the DNN. As a machine learning method for the artificial neural network, both unsupervised learning and supervised learning may be used. The controller 180 may control an artificial neural network structure to enable the artificial neural network structure to be updated after being trained according to a setting.

Figure 4:
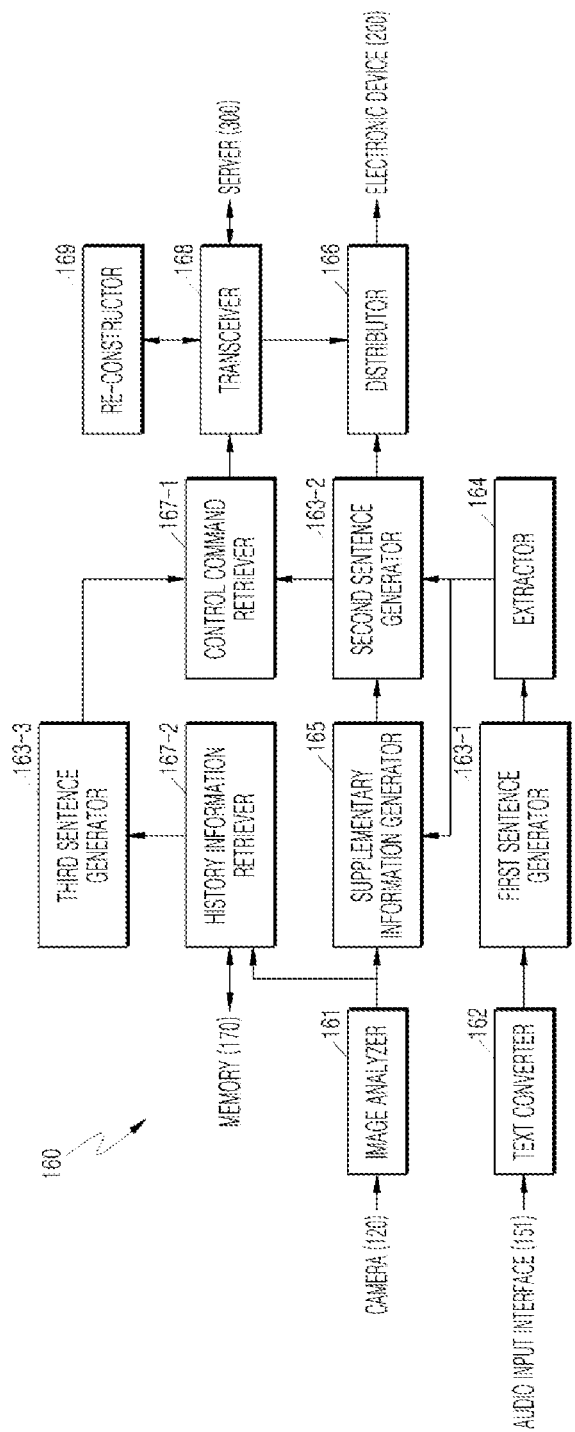
FIG. 4 is a diagram schematically illustrating a detailed configuration of an information processor of the information processing apparatus of FIG. 3.

FIG. 4 is a diagram schematically illustrating a detailed configuration of the information processor of the information processing apparatus of FIG. 3. In the following description, description overlapping with those of FIGS. 1 to 3 will be omitted. Referring to FIG. 4, the information processor 160 may include an image analyzer 161, a text converter 162, a first sentence generator 163-1 to a third sentence generator 163-3, an extractor 164, a supplementary information generator 165, a distributor 166, a control command retriever 167-1, the history information retriever 167-2, a transceiver 168, and a re-constructor 169.

In an alternative embodiment, the information processor 160 may include one or more processors. In an alternative embodiment, the image analyzer 161 to the re-constructor 169 may correspond to one or more processors. In an alternative embodiment, the image analyzer 161 to the re-constructor 169 may correspond to software components configured to be executed by the one or more processors.

The image analyzer 161 may obtain image information including the controlled object and the controlling subject through a camera, and assign identification information to the controlled object and the controlling subject, respectively, based on analysis of the image information.

The image analyzer 161 may extract feature points from the image information, and identify first and second objects based on the feature points.

Unlike document information, because the image information is not immediately interpretable, the feature points need to be extracted first. For example, when identifying a circle and a polygon, the feature points representing vertices may be used. An object having three vertices may be classified as a triangle, and an object having no vertex may be classified as a circle. In addition to the vertices, the feature points may be extracted to form various patterns. The feature point represents a point having a sharp change in the image information.

The image analyzer 161 may use various methods to extract the feature points from the image information. The image analyzer 161 may use, for example, a scale-invariant feature transform (SIFT) algorithm or a speeded-up robust feature (SURF) algorithm, as a method of extracting the feature points from the image information.

The SIFT algorithm is an algorithm capable of extracting feature points regardless of the size of image. For example, when using the feature points representing the vertices, a size of the pattern formed by the vertices will also vary with the size of image. In this case, although the vertices may be extracted from a specific size of image, a problem may occur in which no vertex may be extracted from a relatively large or small image. The SIFT algorithm is an algorithm that may extract a specific pattern with the feature points regardless of the size of image by addressing this problem.

The SURF algorithm is an algorithm capable of finding feature points of an image relatively faster than the SIFT algorithm. Like the SIFT algorithm, the SURF algorithm may find the feature points regardless of the size of image. However, the SURF algorithm is also excellent in terms of the speed of finding the feature points. The SURF algorithm may also be used to analyze a large image or video. Although the SIFT algorithm and the SURF algorithm have been described above as algorithms for extracting feature points for each of one or more objects from the image information, these are merely exemplary and various methods may be used.

The image analyzer 161 may identify the controlled object and the controlling subject based on the feature points extracted from the image information. In the memory 170, the identification information on each of the objects corresponding to the feature points is predetermined together with the feature points, and the identification information on each of the users corresponding to the feature points is predetermined together with the feature points. The image analyzer 161 may assign the predetermined identification information to the controlled object and the controlling subject, respectively, according to a result of determining whether the object is the controlled object or the controlling subject.

Based on a result of comparing the feature points of the controlled object with the feature points of the objects previously stored in the memory 170, the image analyzer 161 may select an object having feature points corresponding to the feature points of the controlled object, and assign the identification information on the selected object to the controlled object.

Based on a result of comparing the feature points of the controlling subject with the feature points of the users previously stored in the memory 170, the image analyzer 161 may select a user having feature points corresponding to the feature points of the controlling subject, and assign the identification information on the selected user to the controlling subject.

In an alternative embodiment, the image analyzer 161 may identify objects through various methods. That is, the image analyzer 161 may identify types of the objects through, for example, a support vector machine (SVM) algorithm or a neural networks (NN) algorithm. Identifying the types of the objects may mean knowing, for example, names of the objects or what the objects are. For example, when the object is the controlling subject, the image analyzer 161 may know a name or identification information (ID) of the controlling subject. In addition, when the object is the controlled object, the image analyzer 161 may know, for example, a name, location, and identification information (ID) of the electronic device 200. In this case, the image analyzer 161 may refer to feature and identification information on the controlling subject and feature and identification information on the controlled object that have been previously stored in the memory 170. Accordingly, the image analyzer 161 may compare a partial image of the object with the existing data to find the controlling subject or controlled object having the same image as that object from the existing data and then find the type, such as a name or identification information, of that object. Subsequently, the image analyzer 161 may convert the partial image of the object into an identification information text.

Here, the SVM algorithm, which is an algorithm capable of finding a hyperplane capable of best identifying given data, may use only a support vector located at a boundary between different classes of data. The NN algorithm, which is an algorithm capable of learning weights to maximize a likelihood defined by energy and minimize an error, may use all data to learn all weight matrices between layers.

In an alternative embodiment, the image analyzer 161 may use a deep neural network model that has been pre-trained to identify the corresponding type of the object based on the analysis of the feature points of the image, thereby determining, based on the feature points extracted from the image information, whether the object included in the image information is the controlled object or the controlling subject. Here, training the deep neural network model may be performed through supervised learning, and the learning may be performed using data in which various feature information extracted from numerous objects are labeled with the object corresponding to the feature information included in the image.

The text converter 162 may obtain, through the audio input interface, the utterance information spoken by the controlling subject, and generate the utterance text by converting the utterance information into text. The text converter 162 may use a speech to text (STT) algorithm to convert the utterance information into the utterance text. The text converter 162 may remove a noise signal from the utterance information, and extract a predetermined feature vector (parameter). Here, the predetermined feature vector may include, for example, linear predictive coefficients (LPC) cepstrum, perceptual linear prediction (PLC) cepstrum, mel frequency cepstral coefficients (MFCC), and filterbank energy. The text converter 162 may find a word most similar to the extracted feature vector with reference to a dictionary including vocabularies of the recognized objects which have been already obtained in the learning process, and may convert the extracted feature vector into the most similar word text.

The first sentence generator 163-1 may generate the first sentence based on analysis of the utterance text. The first sentence generator 163-1 may analyze the utterance text in terms of morpheme units based on a morpheme dictionary, and may tag parts-of-speech to the morpheme units. Here, the morpheme units may include, for example, a general noun/NNG, a subject particle/JKS, an adjective/VA, a conjunctive ending/EF, a period, a question mark, and an exclamation mark/SF.

The first sentence generator 163-1 may analyze the syntax of the morphemes tagged with the parts-of-speech, based on a predefined rule and a dictionary, and then generate the first sentence. Here, the syntax may refer to chunks in which the morpheme units are combined into larger units, such as a noun phrase, a verb phrase, and an adjective phrase, after analyzing the utterance text in terms of the morpheme units and tagging the parts-of-speech to the morpheme units. The first sentence generator 163-1 may analyze the syntax of the utterance text, based on the predefined rule and the dictionary, such as a system dictionary, a user dictionary, and a stopword dictionary, which are stored in the memory 170.

The extractor 164 may extract a missing sentence component from the first sentence based on sentence structure analysis. Here, analyzing the sentence structure may mean determining whether there is a subject, an object, and a predicate in the sentence. The extractor 164 may analyze the sentence structure of the first sentence, compare the first sentence with a complete sentence composed of a subject, an object and a predicate, and extract the missing sentence component (for example, the subject and the predicate) from the first sentence. For example, when the first sentence is "TV", the extractor 164 may determine that, with respect to the object (TV), the subject to process the TV and the predicate for how to process the TV are missing. Accordingly, the extractor 164 may extract the subject and the predicate as the missing sentence components, from the exemplary first sentence described above.

The supplementary information generator 165 may generate supplementary information by using one or more of the identification information on the controlling subject and a group of control commands in text form indicating possible functions of the controlled object in its current state as known from the identification information on the controlled object, in response to the extraction of the missing sentence components.

In the above-described example, when the missing sentence component is the subject, the supplementary information generator 165 may generate the supplementary information to supplement the missing sentence component (the subject), by using the identification information on the controlling subject obtained from the image analyzer 161.

In addition, when the missing sentence component is the predicate, the supplementary information generator 165 may check a current operation state of the controlled object by using the identification information on the controlled object obtained from the image analyzer 161. Subsequently, the supplementary information generator 165 may generate supplementary information to supplement the missing sentence component (the predicate), by using one (for example, the first control command) of a group of control commands in text form indicating possible functions of the controlled object in its current state. For example, when the identification information on the controlled object (TV 203) is TV_C_1 and the current state of the TV 203 is a power-off state, the only possible function of the TV 203 in its current state is a power-on function, and the supplementary information generator 165 may generate the supplementary information to supplement the missing sentence component (the predicate) by using the first control command (TV_ON) in text form indicating power-on.

In an alternative embodiment, with respect to the missing sentence component, the supplementary information generator 165 may be preset to supplement the subject with the identification information on the controlling subject, supplement the object with the identification information on the controlled object, and supplement the predicate with the first control command for the controlled object.

The second sentence generator 163-2 may generate a second sentence in which the missing sentence component is supplemented with the supplementary information generated by the supplementary information generator 165. In the above-described example, when the first sentence is "TV", the second sentence generator 163-2 may generate the sentence "The identification information (for example, the dad) on the controlling subject is performing the first control command (TV_ON) with respect to the identification information (the TV 203, TV_C_1) on the controlled object. Thus, turn on the TV (according to the dad's instruction)" as the second sentence supplemented with the missing sentence components (the subject and the predicate).

The distributor 166 may call the controlled object by using the identification information on the controlled object included in the second sentence, and distribute the first control command included in the second sentence of the group of control commands to the called controlled object.

Before the second sentence generator 163-2 transmits the second sentence to the distributor 166, the control command retriever 167-1 may retrieve whether the same control command as the first control command included in the second sentence is present among control commands previously stored in the memory 170, based on a result of comparing the first control command with the control commands previously stored in the memory 170.

When the same control command as the first control command is present in the memory 170, the control command retriever 167-1 may transmit the retrieval result to the second sentence generator 163-2, and the second sentence generator 163-2 may transmit the second sentence to the distributor 166.

However, when the same control command as the first control command is not present in the memory 170, since the controlled object is unable to be controlled, the control command retriever 167-1 may transmit the retrieval result to the transceiver 168, and the transceiver 168 may transmit the second sentence together with a natural language processing request signal to the server 300.

Here, before transmitting the second sentence to the server 300, the transceiver 168 may transmit the second sentence to the re-constructor 169. The re-constructor 169 may reconstruct the second sentence into a grammatical sentence. The re-constructor 169 may transmit the reconstructed second sentence to the transceiver 168. The transceiver 168 may transmit the reconstructed second sentence to the server 300.

Subsequently, the transceiver 168 may receive, from the server 300, a natural language processing result of the second sentence. Here, the natural language processing result of the second sentence may include at least the identification information on the controlled object and the first control command for controlling the controlled object. The transceiver 168 may transmit, to the distributor 166, the natural language processing result of the second sentence received from the server 300. The distributor 166 may call the controlled object by using the natural language processing result of the second sentence, and distribute the first control command to the called controlled object.

In addition, after the second sentence generator 163-2 generates the second sentence, the history information retriever 167-2 may retrieve whether historical activity information regarding the controlling subject having controlled the controlled object is present in the memory 170.

When the historical activity information is present in the memory 170, the history information retriever 167-2 may transmit the retrieval result to the third sentence generator 163.

The third sentence generator 163-3 may generate, from the historical activity information, the third sentence in text form indicating the second control command preferred by the controlling subject in relation to the controlled object and the identification information on the controlling subject.

For example, in the above-described example, it was assumed that the utterance text is "TV", and that the second sentence "The identification information (for example, the dad) on the controlling subject is performing the first control command (TV_ON) with respect to the identification information (the TV 203, TV_C_1) on the controlled object. Thus, turn on the TV (according to the dad's instruction)" is generated. When the historical activity information stored in the memory 170 indicates that since the identification information (the dad) on the controlling subject frequently watches channel number 7 on the controlled object (the TV 203), the dad's preferred TV channel number is 7, the third sentence generator 163-3 may generate the sentence "Switch to channel number 7" as the second control command preferred by the controlling subject in relation to the controlled object.

The second sentence generated by the second sentence generator 163-2 and the third sentence generated by the third sentence generator 163-3 may be transmitted to the distributor 166. The distributor 166 may call the controlled object by using the identification information on the controlled object included in the second and third sentences, and distribute the first control command included in the second sentence and the second control command included in the third sentence to the called controlled object. For example, even if the controlling subject (the dad) simply speaks "TV", the controlled object (the TV 203) turns on and switches to channel number 7, so that the dad may watch channel number 7.

In an alternative embodiment, the distributor 166 may synthesize the second sentence and the third sentence to generate a new control command for controlling the controlled object. In the above-described example, the distributor 166 may synthesize the first control command "Turn on TV (TV_ON)" and the second control command "Switch to channel number 7". In this case, by using a deep neural network model trained through word embedding, it may be understood that the sentence "Turn on" means turning on the TV 203 of a plurality of controlled objects, and the sentence "Switch" does not mean turning on the TV 203, but means switching to channel number 7. Accordingly, the distributor 166 may generate the sentence "Switch to channel number 7" as a new control command, and distribute the new control command to the called controlled object (the TV 203).

Before the second sentence generator 163-2 and the third sentence generator 163-3 transmit the second sentence and the third sentence to the distributor 166, respectively, the control command retriever 167-1 may retrieve whether the same control command as one or more of the first control command included in the second sentence and the second control command included in the third sentence is present among the control commands previously stored in the memory 170, based on a result of comparing the first control command and the second control command with the control commands previously stored in the memory 170.

When the same control commands as the first and second control commands are present in the memory 170, the control command retriever 167-1 may transmit the retrieval result to the second sentence generator 163-2 and the third sentence generator 163-3, the second sentence generator 163-2 may transmit the second sentence to the distributor 166, and the third sentence generator 163-3 may transmit the third sentence to the distributor 166.

However, when the same control command as one or more of the first and second control commands is not present in the memory 170, since the controlled object is unable to be controlled, the control command retriever 167-1 may transmit the retrieval result to the transceiver 168, and the transceiver 168 may transmit the second and third sentences together with a natural language processing request signal to the server 300.

Here, before transmitting the second and third sentences to the server 300, the transceiver 168 may transmit the second and third sentences to the re-constructor 169, and the re-constructor 169 may reconstruct the second and third sentences into grammatical sentences. The re-constructor 169 may transmit the reconstructed second and third sentences to the transceiver 168. The transceiver 168 may transmit the reconstructed second and third sentences to the server 300.

Subsequently, the transceiver 168 may receive, from the server 300, natural language processing results of the second and third sentences. Here, the natural language processing results of the second and third sentences may include at least the identification information on the controlled object and the first and second control commands for controlling the controlled object. The transceiver 168 may transmit, to the distributor 166, the natural language processing results of the second and third sentences received from the server 300. The distributor 166 may call the controlled object by using the natural language processing results of the second and third sentences, and distribute the first and second control commands to the called controlled object.

Figure 5A:
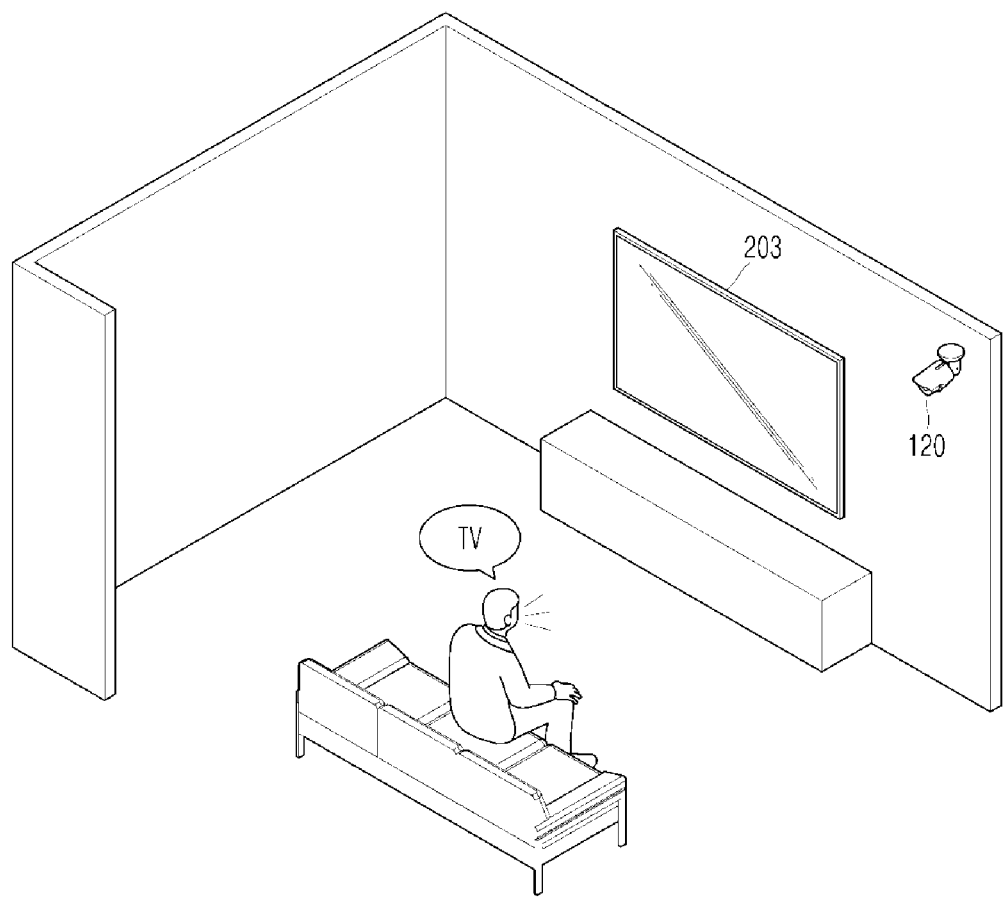
FIGS. 5A and 5B are diagrams illustrating information processing of an information processing apparatus, according to one embodiment of the present disclosure.
Figure 5B:
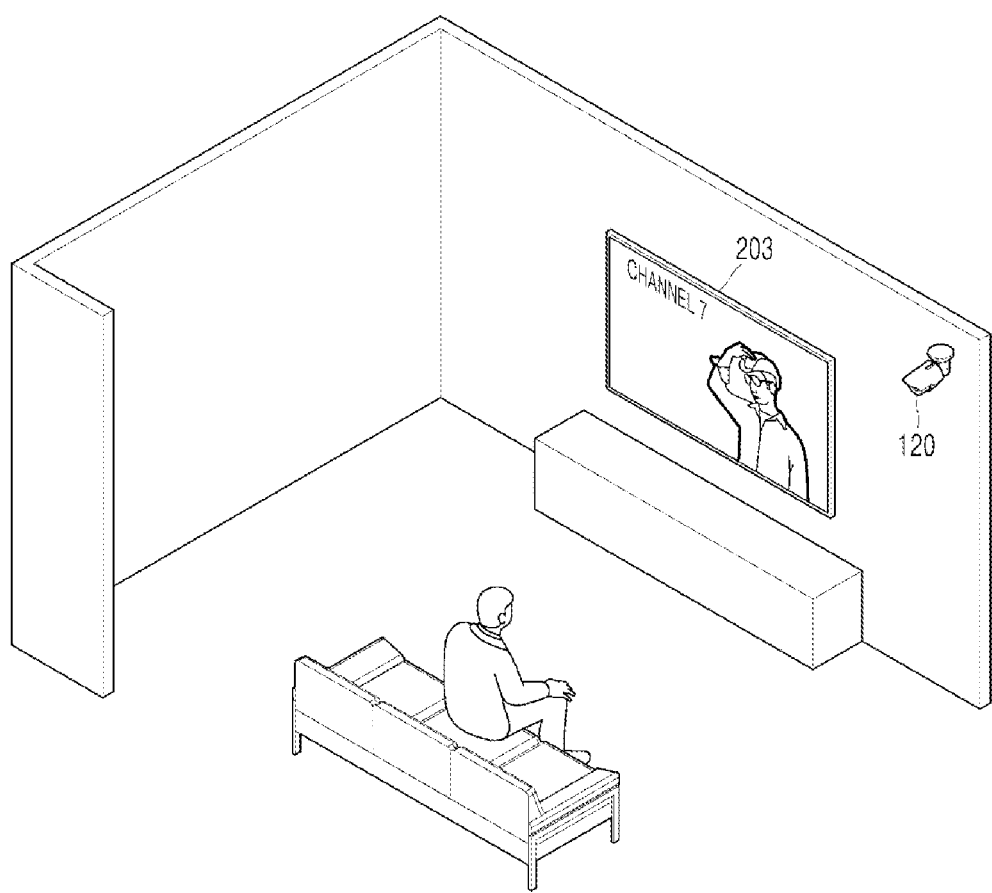

FIGS. 5A and 5B are diagrams illustrating information processing of the information processing apparatus, according one embodiment of the present disclosure. In the following description, description overlapping with those of FIGS. 1 to 4 will be omitted. FIG. 5A shows a situation in which the controlling subject speaks "TV" as the utterance information, and FIG. 5B shows that the TV 203 turns on after the controlling subject speaks "TV" and then the controlling subject's preferred channel number 7 is displayed.

Referring to FIG. 5A, when the controlling subject speaks "TV" as the utterance information, the information processing apparatus 100 may convert the utterance information into utterance text "TV". In addition, based on analysis of the image information obtained through the camera 120, the information processing apparatus 100 may assign the identification information (for example, the dad) to the controlling subject, and assign the identification information (for example, TV_C_1) to the controlled object (the TV 203).

Based on a result of comparing the first sentence "TV" of the utterance text with a complete sentence composed of a subject, an object, and a predicate, the information processing apparatus 100 may determine that missing sentence components in the first sentence are the subject and the predicate.

The information processing apparatus 100 may use a predetermined supplementary information generation condition for supplementing the subject with the identification information on the controlling subject, supplementing the object with the identification information on the controlled object, and supplementing the predicate with the first control command for the controlled object. The information processing apparatus 100 may supplement the missing sentence component (the subject) with the identification information (the dad) on the controlling subject. To supplement the missing sentence component (the predicate), the information processing apparatus 100 may first determine, based on the identification information (TV_C_1) on the controlled object, that the current operation state of the TV 203 is a power-off state. Subsequently, when the possible function of the TV 203 in its current state is a power-on function, the information processing apparatus 100 may generate the first control command (TV_ON) in a text form indicating "power-on" as supplementary information to supplement the missing sentence component (the predicate). The information processing apparatus 100 may generate the sentence "The identification information (for example, the dad) on the controlling subject is performing the first control command (TV_ON) with respect to the identification information (the TV 203, TV_C_1) on the controlled object" as the second sentence.

In addition, the information processing apparatus 100 may retrieve whether the historical activity information regarding the controlling subject having controlled the controlled object is present in the memory 170, may determine, from the historical activity information if present in the memory 170, that since the identification information (the dad) on the controlling subject frequently watches channel number 7 on the controlled object (the TV 203), the dad's preferred TV channel number is 7, and may generate the sentence "Switch to channel number 7" as the third sentence.

The information processing apparatus 100 may call the TV 203 by using the identification information (TV_C_1) on the TV 203 included in the second and third sentences, and distribute the first and second control commands to the called controlled object to turn on the TV 203 and display channel number 7 as shown in FIG. 5B. In this manner, even if the dad simply speaks "TV", the TV 203 may turn on, and the dad may watch the preferred channel number 7.

Figure 6:
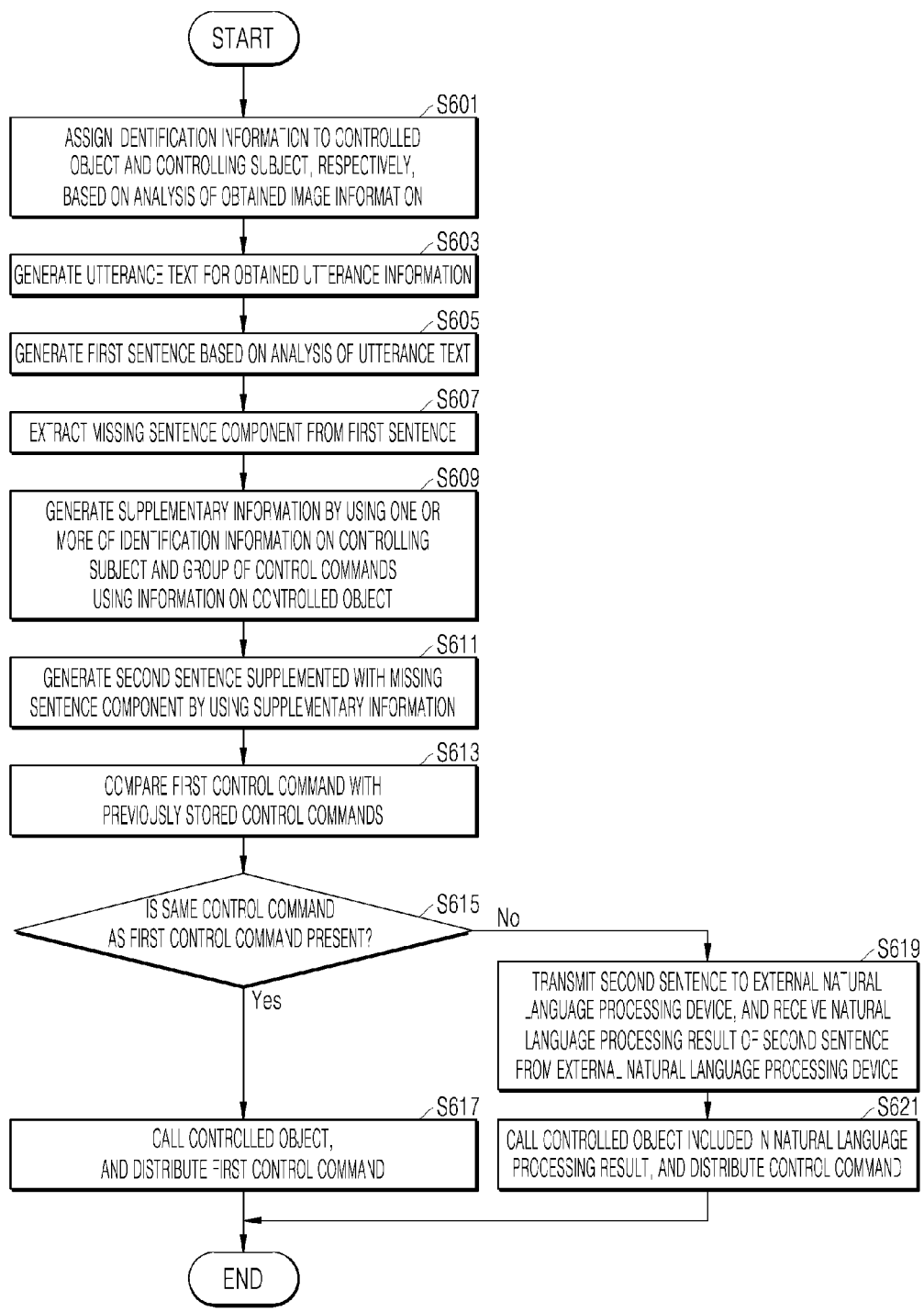
FIG. 6 is a flowchart illustrating an information processing method, according to one embodiment of the present disclosure.

FIG. 6 is a flowchart illustrating an information processing method, according to the present embodiment. In the following description, description overlapping with those of FIGS. 1 to 5 will be omitted.

Referring to FIG. 6, at S601, the information processing apparatus 100 assigns the identification information to the controlled object and the controlling subject, respectively, based on analysis of the image information obtained through the camera 120.

At S603, the information processing apparatus 100 generates the utterance text for the utterance information obtained through the audio input interface 151.

At S605, the information processing apparatus 100 generates the first sentence based on analysis of the utterance text.

At S607, the information processing apparatus 100 extracts a missing sentence component from the first sentence.

At S609, the information processing apparatus 100 generates the supplementary information by using one or more of the identification information on the controlling subject and a group of control commands in text form indicating possible functions of the controlled object in its current state as known from the identification information on the controlled object.

At S611, the information processing apparatus 100 generates the second sentence supplemented with the missing sentence component by using the supplementary information.

At S613, the information processing apparatus 100 compares the first control command with previously stored control commands.

At S615, the information processing apparatus 100 determines whether the same control command as the first control command is present among the previously stored control commands, based on a result of comparing.

At S617, when it is determined that the same control command as the first control command is present among the previously stored control commands, the information processing apparatus 100 calls the controlled object included in the second sentence, and distributes the first control command to the called controlled object.

At S619, when it is determined that the same control command as the first control command is not present among the previously stored control commands, the information processing apparatus 100 transmits the second sentence to the server 300 (an external natural language processing device), and receives a natural language processing result of the second sentence from the server 300.

At S621, the information processing apparatus 100 calls the controlled object included in the natural language processing result, and distributes the control command to the called controlled object.

Figure 7A:
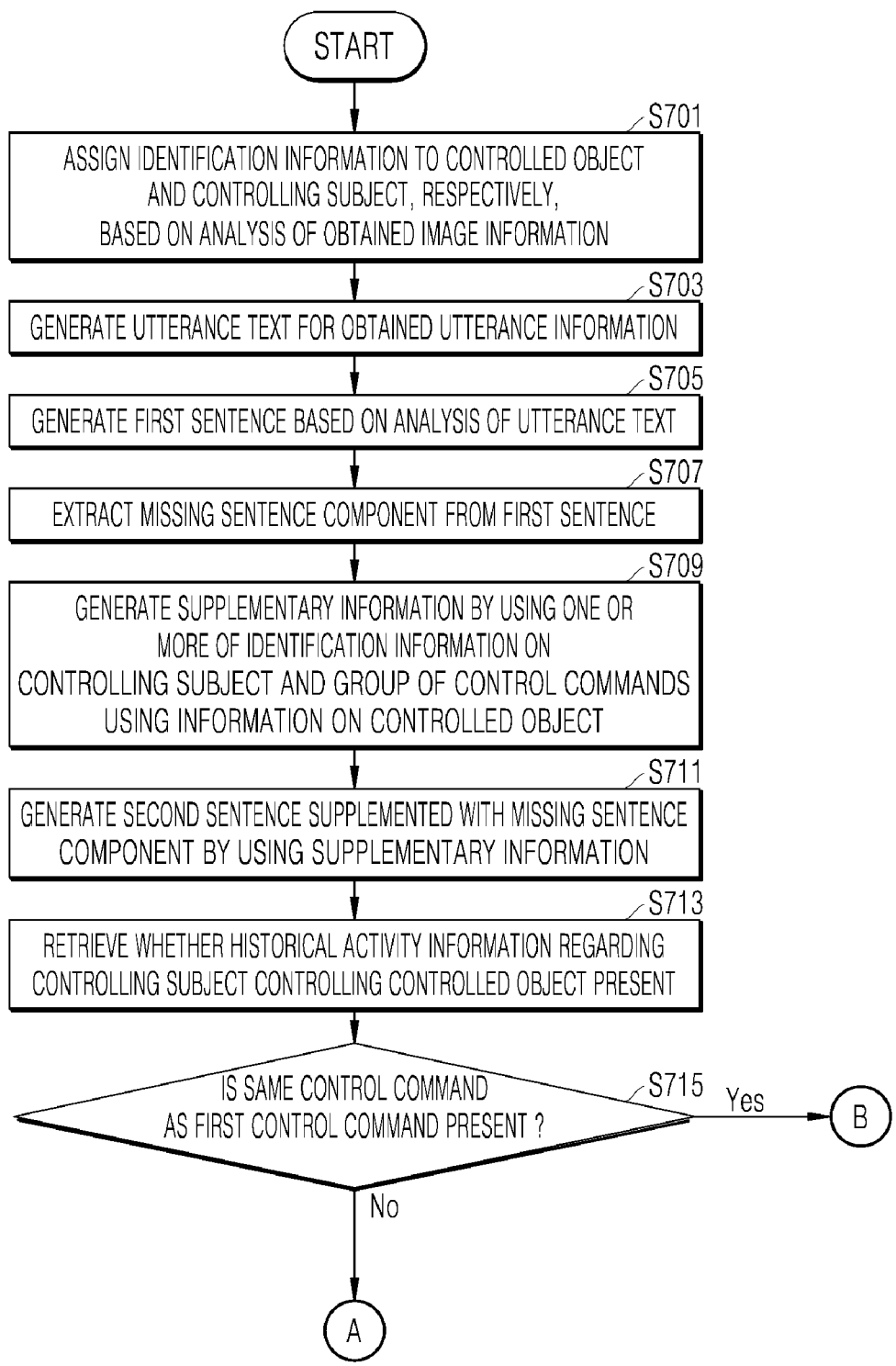
FIGS. 7A to 7C are flowcharts illustrating an information processing method, according to another embodiment of the present disclosure.
Figure 7B:
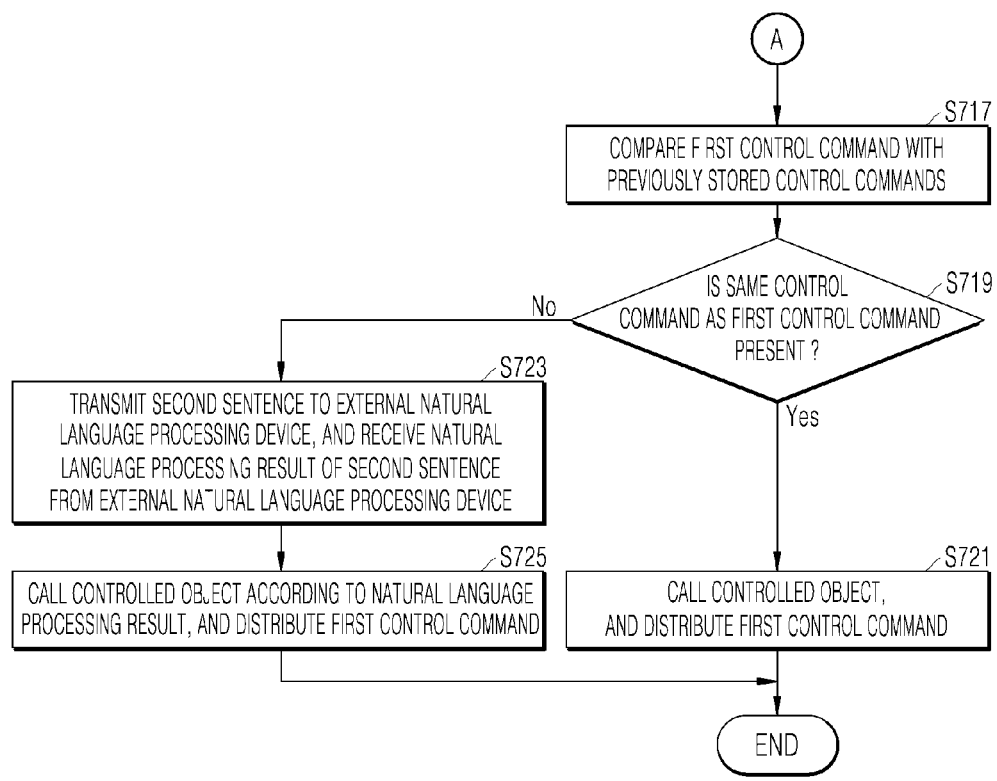
Figure 7C:
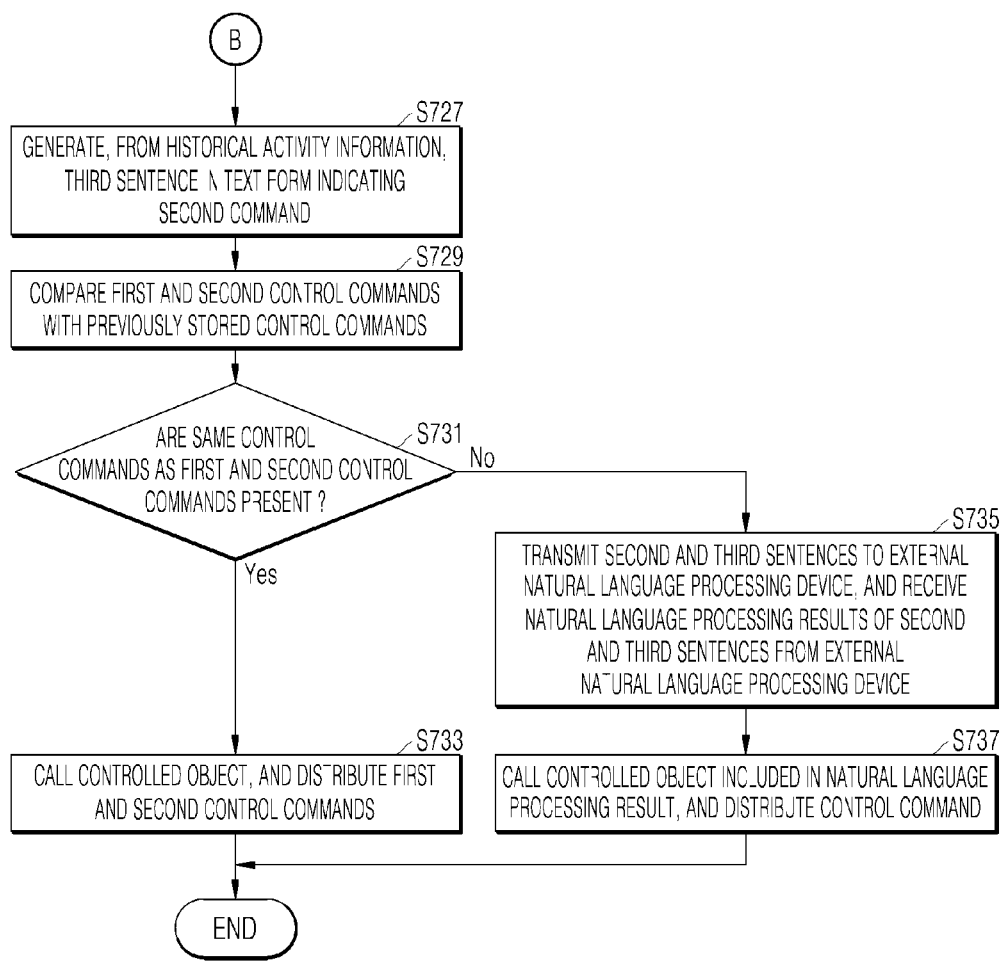

FIGS. 7A to 7C are flowcharts illustrating an information processing method, according to another embodiment. In the following description, description overlapping with those of FIGS. 1 to 6 will be omitted.

Referring to FIGS. 7A to 7C, at S701, the information processing apparatus 100 assigns the identification information to the controlled object and the controlling subject, respectively, based on analysis of the image information obtained through the camera 120.

At S703, the information processing apparatus 100 generates the utterance text for the utterance information obtained through the audio input interface 151.

At S705, the information processing apparatus 100 generates the first sentence based on analysis of the utterance text.

At S707, the information processing apparatus 100 extracts a missing sentence component from the first sentence.

At S709, the information processing apparatus 100 generates the supplementary information by using one or more of the identification information on the controlling subject and a group of control commands in text form indicating possible functions of the controlled object in its current state as known from the identification information on the controlled object.

At S711, the information processing apparatus 100 generates the second sentence supplemented with the missing sentence component by using the supplementary information.

At S713, the information processing apparatus 100 retrieves whether historical activity information regarding the controlling subject having controlled the controlled object is present in the memory 170.

At S715, the information processing apparatus 100 determines whether the same control command as the first control command is present in the memory 170.

At S717, when it is determined that no historical activity information regarding the controlling subject having controlled the controlled object is present in the memory 170, the information processing apparatus 100 compares the first control command with previously stored control commands.

At S719, the information processing apparatus 100 determines whether the same control command as the first control command is present among the previously stored control commands, based on a result of comparing.

At S721, when it is determined that the same control command as the first control command is present among the previously stored control commands, the information processing apparatus 100 calls the controlled object included in the second sentence, and distributes the first control command of a group of control commands to the called controlled object.

At S723, when it is determined that the same control command as the first control command is not present among the previously stored control commands, the information processing apparatus 100 transmits the second sentence to the server 300 (the external natural language processing device), and receives the natural language processing result of the second sentence from the server 300.

At S725, the information processing apparatus 100 calls the controlled object included in the natural language processing result, and distributes the control command to the called controlled object.

At S727, when it is determined that the historical activity information regarding the controlling subject having controlled the controlled object is not present in the memory 170, the information processing apparatus 100 generates, from the historical activity information, the third sentence in text form indicating the second command.

At S729, the information processing apparatus 100 compares the first and second control commands with previously stored control commands.

At S731, the information processing apparatus 100 determines whether the same control commands as the first and second control commands are present among the previously stored control commands.

At S733, when it is determined that the same control commands as the first and second control commands are present among the previously stored control commands, the information processing apparatus 100 calls the controlled object, and distributes the first and second control commands to the called controlled object.

At S735, when it is determined that the same control commands as the first and second control commands are not present among the previously stored control commands, the information processing apparatus 100 transmits the second and third sentences to the server 300 (the external natural language processing device), and receives the natural language processing results of the second and third sentences from the server 300.

At S737, the information processing apparatus 100 calls the controlled object included in the natural language processing result, and distributes the control command to the called controlled object.

Embodiments according to the present disclosure described above may be implemented in the form of computer programs that may be executed through various components on a computer, and such computer programs may be recorded on computer-readable medium. Examples of the computer-readable medium include, but are not limited to:

magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of computer programs may include both machine codes, such as produced by a compiler, and higher-level codes that may be executed by the computer using an interpreter.

As used in the present disclosure (especially in the appended claims), the terms "a/an" and "the" include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example," etc.) used herein are merely to describe the present disclosure in greater detail. Therefore, it should be understood that the scope of the present disclosure is not limited to the exemplary embodiments described above or by the use of such terms unless limited by the appended claims. Also, it should be apparent to those skilled in the art that various alterations, substitutions, and modifications may be made within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. An information processing method, comprising:
   obtaining image information including a controlled object and a controlling subject;
   assigning a first identification information to the controlled object and a second identification information to the controlling subject;
   obtaining speech information spoken by the controlling subject;
   generating speech text based on the obtained speech information;
   generating a first sentence based on analyzing the generated speech text;
   identifying a missing sentence component from the generated first sentence based on analyzing a sentence structure of the generated first sentence, wherein the missing sentence component corresponds to a predicate or a subject;
   generating text information by using at least one of the assigned second identification information or available functions for the controlled object in a current state determined based on the assigned first identification information;
   generating a second sentence comprising the controlled object, a subject, and a predicate, wherein the subject or the predicate is based on the generated text information; and
   causing an instruction to be transmitted to cause the controlled object to perform a first function corresponding to the predicate from the generated second sentence, wherein the first function is from among the available functions.

2. The method of claim 1, further comprising:
   prior to causing the instruction to be transmitted, searching a memory for the first function;
   transmitting, to an external natural language processor, the generated second sentence based on determining that the first function is not present in the memory; and
   receiving, from the external natural language processor, a natural language processing result of the generated second sentence.

3. The method of claim 2, wherein the generated second sentence is reconstructed into a grammatical sentence prior to transmitting the generated second sentence.

4. The method of claim 1, further comprising:
   after generating the second sentence, searching a memory for historical activity information regarding the controlling subject interacting with the controlled object; and
   upon a determination that the historical activity information is found in the memory, generating a third sentence based on obtaining the historical activity information from the memory, wherein the third sentence indicates a second predicate based on a second function associated with the controlled object, wherein the second function is based on a preference of the controlling subject.

5. The method of claim 4, further comprising causing a second instruction to be transmitted to cause the controlled object to perform the second function corresponding to the second predicate from the generated third sentence.

6. The method of claim 5, further comprising:
   prior to causing the instruction to be transmitted and the second instruction to be transmitted, searching the memory for the first function and the second function;
   upon a determination that the first function or the second function is not found in the memory, transmitting, to an external natural language processor, the generated second sentence, and the generated third sentence; and
   receiving, from the external natural language processor, natural language processing results of the generated second and third sentences.

7. The method of claim 6, wherein the generated second and third sentences are reconstructed into grammatical sentences prior to transmitting the generated second and third sentences.

8. The method of claim 1, wherein assigning the first and the second identification information comprises:
   identifying the controlled object and the controlling subject based on extracting feature points from the image information;
   comparing a specific feature point of the controlled object with feature points of previously stored objects and assigning the first identification information to the controlled object based on a selected object from the previously stored objects; and
   comparing a particular feature point of the controlling subject with feature points of previously stored users and assigning the second identification information to the controlling subject based on a selected user from the previously stored users.

9. The method of claim 8, wherein identifying the controlled object and the controlling subject comprises determining whether the object included in the image information is the controlled object or the controlling subject by using an image-recognition neural network.

10. The method of claim 1, wherein generating the first sentence comprises:
analyzing the speech text in terms of morpheme units based on a morpheme dictionary; and
tagging a part-of-speech to the morpheme units, wherein the first sentence is generated by analyzing a syntax of morphemes tagged with the part-of-speech based on a predefined rule and a dictionary.

11. A device, comprising:
a camera configured to obtain image information including a controlled object and a controlling subject;
a microphone configured to obtain speech information spoken by the controlling subject; and
one or more processors configured to:
assign a first identification information to the controlled object and a second identification information to the controlling subject;
generate speech text based on the obtained speech information;
generate a first sentence based on analyzing the generated speech text;
identify a missing sentence component from the generated first sentence based on analyzing a sentence structure of the generated first sentence, wherein the missing sentence component corresponds to a predicate or a subject;
generate text information by using at least one of the assigned second identification information or available functions for the controlled object in a current state determined based on the assigned first identification information;
generate a second sentence comprising the controlled object, a subject, and a predicate, wherein the subject or the predicate is based on the generated text information; and
cause an instruction to be transmitted to cause the controlled object to perform a first function corresponding to the predicate from the generated second sentence, wherein the first function is from among the available functions.

12. The device of claim 11, wherein the one or more processors are further configured to:
prior to causing the instruction to be transmitted, search a memory for the first function;
transmit, to an external natural language processor, the generated second sentence based on determining that the first function is not present in the memory; and
receive, from the external natural language processor, a natural language processing result of the generated second sentence.

13. The device of claim 12, wherein the generated second sentence is reconstructed into a grammatical sentence prior to transmitting the generated second sentence.

14. The device of claim 11, wherein the one or more processors are further configured to:
after generating the second sentence, search a memory for historical activity information regarding the controlling subject interacting with the controlled object; and
upon a determination that the historical activity information is found in the memory, generate a third sentence based on obtaining the historical activity information from the memory, wherein the third sentence indicates a second predicate based on a second function associated with the controlled object, wherein the second function is based on a preference of the controlling subject.

15. The device of claim 14, wherein the one or more processors are further configured to cause a second instruction to be transmitted to cause the controlled object to perform the second function corresponding to a second predicate from the generated third sentence.

16. The device of claim 15, wherein the one or more processors are further configured to:
prior to causing the instruction to be transmitted and the second instruction to be transmitted, search the memory for the first function and the second function;
upon a determination that the first function or the second function is not found in the memory, transmit, to an external natural language processor, the generated second sentence, and the generated third sentence; and
receive, from the external natural language processor, natural language processing results of the generated second and third sentences.

17. The device of claim 16, wherein the generated second and third sentences are reconstructed into grammatical sentences prior to transmitting the generated second and third sentences.

18. The device of claim 11, wherein assigning the first and the second identification information comprises:
identifying the controlled object and the controlling subject based on extracting feature points from the image information;
comparing a specific feature point of the controlled object with feature points of previously stored objects and assigning the first identification information to the controlled object based on a selected object from the previously stored objects; and
comparing a particular feature point of the controlling subject with feature points of previously stored users and assigning the second identification information to the controlling subject based on a selected user from the previously stored users.

19. The device of claim 18, wherein identifying the controlled object and the controlling subject comprises determining whether the object included in the image information is the controlled object or the controlling subject by using an image-recognition neural network.

20. A machine-readable, non-transitory medium having stored thereon, machine-executable instructions, the instructions comprising:
obtaining image information including a controlled object and a controlling subject;
assigning a first identification information to the controlled object and a second identification information to the controlling subject;
obtaining speech information spoken by the controlling subject;
generating speech text based on the obtained speech information;
generating a first sentence based on analyzing the generated speech text;
identifying a missing sentence component from the generated first sentence based on analyzing a sentence structure of the generated first sentence, wherein the missing sentence component corresponds to a predicate or a subject;

generating text information by using at least one of the assigned second identification information or available functions for the controlled object in a current state determined based on the assigned first identification information;

generating a second sentence comprising the controlled object, a subject, and a predicate, wherein the subject or the predicate is based on the generated text information; and causing an instruction to be transmitted to cause the controlled object to perform a first function corresponding to the predicate from the generated second sentence, wherein the first function is from among the available functions.

* * * * *